(12) United States Patent
Chang et al.

(10) Patent No.: US 9,918,068 B2
(45) Date of Patent: Mar. 13, 2018

(54) METHOD AND APPARATUS OF TEXTURE IMAGE COMPRESS IN 3D VIDEO CODING

(75) Inventors: Yu-Lin Chang, Taipei (TW); Shih-Ta Hsiang, New Taipei (TW); Chi-Ling Wu, Taipei (TW); Chih-Ming Fu, Hsinchu (TW); Chia-Ping Chen, Nantou County (TW); Yu-Pao Tsai, Kaohsiung (TW); Yu-Wen Huang, Taipei (TW); Shaw-Min Lei, Hsinchu County (TW)

(73) Assignee: MEDIA TEK INC., Hsinchu (TW)

( * ) Notice: Subject to any disclaimer, the term of this patent is extended or adjusted under 35 U.S.C. 154(b) by 704 days.

(21) Appl. No.: 14/115,099

(22) PCT Filed: Jun. 15, 2012

(86) PCT No.: PCT/CN2012/076975
§ 371 (c)(1),
(2), (4) Date: Oct. 31, 2013

(87) PCT Pub. No.: WO2012/171477
PCT Pub. Date: Dec. 20, 2012

(65) Prior Publication Data
US 2014/0085416 A1    Mar. 27, 2014

Related U.S. Application Data

(60) Provisional application No. 61/497,441, filed on Jun. 15, 2011.

(51) Int. Cl.
*H04N 13/00* (2006.01)
*H04N 19/597* (2014.01)
(Continued)

(52) U.S. Cl.
CPC .......... *H04N 13/0048* (2013.01); *G06T 9/00* (2013.01); *H04N 19/119* (2014.11); *H04N 19/503* (2014.11); *H04N 19/597* (2014.11)

(58) Field of Classification Search
CPC ............. H04N 13/0048; H04N 19/119; H04N 19/503; H04N 19/597; G06T 9/00
See application file for complete search history.

(56) References Cited

U.S. PATENT DOCUMENTS 5,617,334 A    4/1997  Tseng et al.
9,131,237 B2 *  9/2015  Lee ........................ H04N 19/44
(Continued)

FOREIGN PATENT DOCUMENTS

CN    101911700 A    12/2010
CN    101978697 A    2/2011
(Continued)

OTHER PUBLICATIONS

Depth map enhanced macroblock partitioning for H.264 video coding of computer graphics content (published on Nov. 2009).
(Continued)

*Primary Examiner* — Tat Chio
(74) *Attorney, Agent, or Firm* — Oblon, McClelland, Maier & Neustadt, L.L.P.

(57) ABSTRACT

A method and apparatus for texture image compression in a 3D video coding system are disclosed. Embodiments according to the present invention derive depth information related to a depth map associated with a texture image and then process the texture image based on the depth information derived. The invention can be applied to the encoder side as well as the decoder side. The encoding order or decoding order for the depth maps and the texture images can be based on block-wise interleaving or picture-wise interleaving. One aspect of the present invent is related to
(Continued)

partitioning of the texture image based on depth information of the depth map. Another aspect of the present invention is related to motion vector or motion vector predictor processing based on the depth information.

29 Claims, 5 Drawing Sheets (51) Int. Cl.
*H04N 19/119* (2014.01)
*G06T 9/00* (2006.01)
*H04N 19/503* (2014.01)

(56) References Cited

U.S. PATENT DOCUMENTS

| | | | |
|---|---|---|---|
| 2010/0091858 A1* | 4/2010 | Yang | H04N 19/176 375/240.13 |
| 2010/0278232 A1* | 11/2010 | Yea | H04N 13/0022 375/240.08 |
| 2011/0038420 A1* | 2/2011 | Lee | H04N 19/52 375/240.16 |
| 2012/0195368 A1* | 8/2012 | Chien | H04N 19/52 375/240.02 |
| 2012/0236934 A1* | 9/2012 | Chen | H04N 19/597 375/240.03 |
| 2012/0294510 A1* | 11/2012 | Zhang | G06K 9/2036 382/154 |
| 2012/0307018 A1* | 12/2012 | Damstra | H04N 9/045 348/49 |
| 2013/0022117 A1* | 1/2013 | Lou | H04N 19/96 375/240.16 |

FOREIGN PATENT DOCUMENTS

| | | |
|---|---|---|
| CN | 102017627 A | 4/2011 |
| JP | 2014514799 A | 6/2014 |
| KR | 1020100105877 | 9/2010 |
| KR | 2011-0006696 | 1/2011 |
| WO | 2009/091383 | 7/2009 |
| WO | WO 2009/131688 | 10/2009 |
| WO | WO 20091131688 | 10/2009 |
| WO | WO 2010/043773 | 4/2010 |
| WO | 2011046607 A2 | 4/2011 |
| WO | 2012122364 A1 | 9/2012 |

OTHER PUBLICATIONS

Depth assisted object segmentation in multi-view video (published on May 28-30, 2008).
Cernigliaro, G., et al.; "Fast Mode Decision for Multiview Video Coding based on Depth Maps;" Visual Communications and Image Processing; 2009; pp. 1-10; vol. 7257, 72570N, XP030081731, SPIE-IS&T.
Po, L.M., et al.; "Automatic 2D-To-3D Video Conversion Technique Based on Depth-From-Motion and Color Segmentation;" ICSP2010 Proceedings; 2010; pp. 1000-1003; XP031816636, IEEE.
Zhang, L., et al.; "3D-TV Content Creation: Automatic 2D-to-3D Video Conversion;" IEEE Transactions on Broadcasting; Jun. 2011; pp. 372-383; vol. 57, No. 2; XP011476781, IEEE.
Sun, Z., et al.; "Trifocal Motion Modeling for Object-Based Video Compression and Manipulation;" IEEE Transactions on Circuits and Systems for Video Technology; Sep. 1998; pp. 667-685; vol. 8, No. 5, XP011014500, IEEE.
Klimaszewski, K., et al.; "Joint Intra Coding of Video and Depth Maps;" ICSES 2010—The International Conference on Signals and Electronics Systems; Sep. 7-10, 2010; pp. 111-114; XP031770773, Gliwice, Poland.
Zhu, G., et al.; "Inter-view Skip Mode with Depth Information, Joint Video Team (JVT) of ISO/IEC MPEG & ITU-T VCEG (ISO/IEC JTC1/SC29/WG11 and ITU-T SG16 Q.6);" 26th Meeting; Jan. 13-18, 2008; pp. 1-9; Document: JVT-Z029 Filename: JVT-Z029. doc, Antalya, TR.
Yu, L., et al.; "Description of Video Coding Technology Proposal by Zhejiang University;" International Organisation for Standardisation; Nov. 2011; pp. 1-16.

* cited by examiner

Fig. 5

METHOD AND APPARATUS OF TEXTURE IMAGE COMPRESS IN 3D VIDEO CODING

CROSS REFERENCE TO RELATED APPLICATIONS

The present invention claims priority to U.S. Provisional Patent Application Ser. No. 61/497,441, filed Jun. 15, 2011, entitled "Method of compressing texture images using depth maps in 3D video coding". The U.S. Provisional patent application is hereby incorporated by reference in its entirety.

BACKGROUND OF THE INVENTION

Field of the Invention

The present invention relates to video coding. In particular, the present invention relates to texture image compression in 3D video coding.

Description of the Related Art

Three-dimensional (3D) television has been a technology trend in recent years that targets to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth. A straightforward approach may simply apply conventional video coding techniques to each single-view video sequence independently and disregard any correlation among different views. In order to improve multi-view video coding efficiency, typical multi-view video coding always exploits inter-view redundancy.

While inter-view correlation is useful for improving coding efficiency of texture images in 3D video coding, there is also significant correlation between the texture images and the depth maps. It should be beneficial to exploit the correlation between the texture images and the depth maps to further improve coding efficiency of texture image compression. Furthermore, it is desirable to develop a texture image compression scheme with improved coding efficient upon an existing high efficiency coding standards such as H.264/AVC or the emerging High Efficiency Video Coding (HEVC) system.

BRIEF SUMMARY OF THE INVENTION

A method and apparatus for texture image compression in a 3D video coding system are disclosed. Embodiments according to the present invention first derive depth information related to a depth map associated with a texture image and then process the texture image based on the depth information derived. The invention can be applied to the encoder side as well as the decoder side. The depth information may include depth data and partition information. The depth map can be either decoded from a first bitstream comprising a first compressed depth map for a current view, decoded and derived from a second bitstream comprising second compressed depth map for other view, or derived from a decoded texture image. The encoding order or decoding order for the depth map and the texture image can be based on block-wise interleaving or picture-wise interleaving. The block-wise interleaving or the picture-wise interleaving can be selected according to a flag in a bitstream associated with the texture image. Furthermore, the flag can be incorporated in a sequence level, a picture level, a slice level, or a block level.

One aspect of the present invent is related to partitioning of the texture image based on depth information of the depth map, wherein the texture image is partitioned into texture blocks and wherein partitioning a current texture block of the texture image is based on the depth information of the depth map. The texture blocks can be in arbitrary shapes or rectangular shapes. Whether a current texture block of the texture image is partitioned into sub-blocks can be based on the depth information of a corresponding block of the depth map. Shapes of the sub-blocks can be based on the depth information of the corresponding block of the depth map. A flag can be used to indicate whether the depth information of the corresponding block of the depth map is used for partitioning the current texture block of the texture image into the sub-blocks. Whether a current texture block of the texture image is merged with another texture block of the texture image can be based on the depth information of the depth map.

In another embodiment according to the present invention, the texture image is partitioned into texture blocks and wherein motion information of a texture block of the texture image can be derived from the motion information of a corresponding texture block in another view. The location of the corresponding texture block can be derived based on the depth map in a current view. The motion information may include MVs, reference picture index, region partitions, prediction direction, and prediction mode. In yet another embodiment according to the present invention, prediction modes for the texture image can be determined according to motion vectors associated with the texture image, and wherein the motion vectors are classified based on the depth information. The regions corresponding to near objects in the texture image as indicated by the depth information may prefer to select spatial MVPs (Motion Vector Predictors) while the regions corresponding to far objects in the texture image as indicated by the depth information may prefer to select temporal or inter-view MVPs.

Another aspect of the present invention is related to motion vector or motion vector predictor processing. In one embodiment, pruning MVPs (Motion Vector Predictors) for the texture image can be based on motion vectors associated with the texture image, and wherein the motion vectors are classified based on the depth information. One or more redundant candidate MVPs can be removed from MVP candidate list, and wherein the candidate MVPs with large motions for regions corresponding to far objects in the texture image as indicated by the depth information can be removed or given low priorities in the MVP candidate list. Motion models for deriving motion vectors for the texture image are determined based on the depth map. The regions corresponding to far objects in the texture image can derive the motion vectors according to a translation model and the regions corresponding to near objects in the texture image can derive the motion vectors according to a perspective model. In yet another embodiment, the mode for a current region of the texture image can be determined based on the mode of a corresponding region of a corresponding texture image in another view. The location of the corresponding region can be derived from the location of the current region and the location correspondence between the depth map associated with the texture image and the depth map associated with the corresponding texture image in another view. The mode may include partitions, inter/intra modes, and skip modes.

DETAILED DESCRIPTION OF THE INVENTION

Embodiments of the present invention provide a method and apparatus for encoding and decoding texture images in a 3D video coding system. According to the present invention, encoding and decoding texture images utilize information of corresponding depth maps. The correlation between the texture images and the depth maps is useful for improving the coding efficiency of texture image compression.

Figure 1:
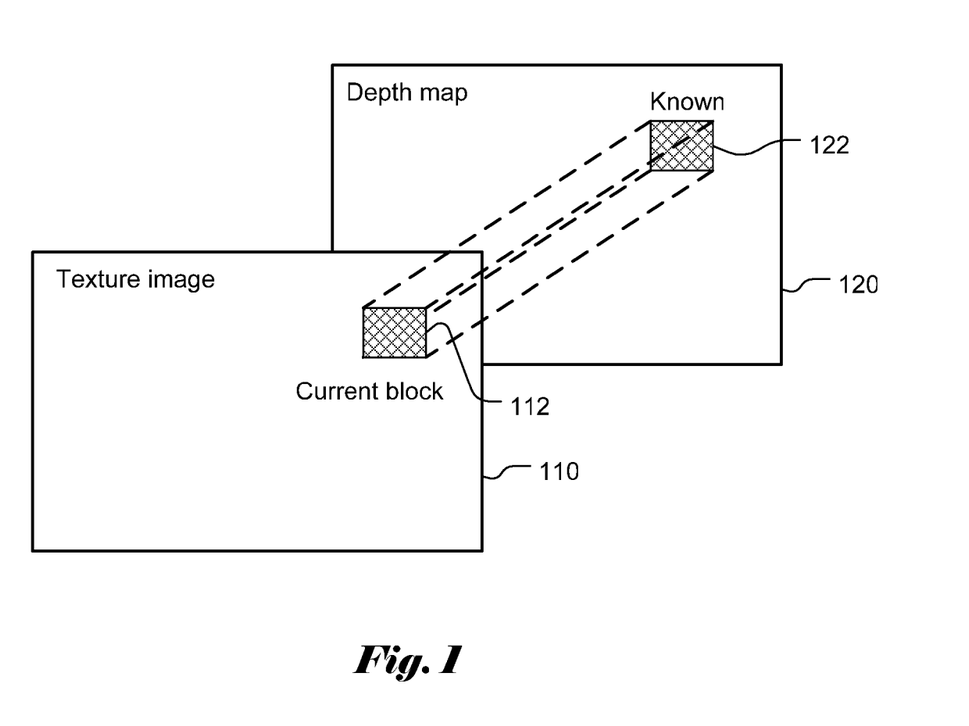
FIG. 1 illustrates an example of texture image compression utilizing depth information according to the present invention.

According to one embodiment of the present invention, the depth map is coded before the respective texture image. Therefore, the texture image compression can utilize depth information associated with depth maps. The depth information may include depth data and partition information. The partition information usually is generated during encoding of the depth map since a typical coding system often partition the depth map into blocks or regions and applies encoding process on a block or region basis. The coding order of depth map and texture can be in a picture-wise or block-wise manner. FIG. 1 illustrates an example of texture image compression utilizing depth information from the depth map. Compression of a current block 112 in the texture image 110 can utilize information from the corresponding depth map 120. A block 122 in the depth map 120 corresponding to the current block 112 can be identified. Since the information for the corresponding block 122 is available before processing the current block 112 in the texture image 110, the depth information for the corresponding block 122 can be used for compression of the current block 112 to improve coding efficiency. While the example of FIG. 1 illustrates that a corresponding block in the depth map is used for compression of the current block 112, more than one block in the depth map may also be used for compression of the current block of the texture image as long as depth information of these blocks in the depth map is known before processing the current block. Furthermore, blocks from more than one depth maps may also be used to practice the present invention if depth information of blocks in these depth maps is known before processing the current block.

Figure 2:
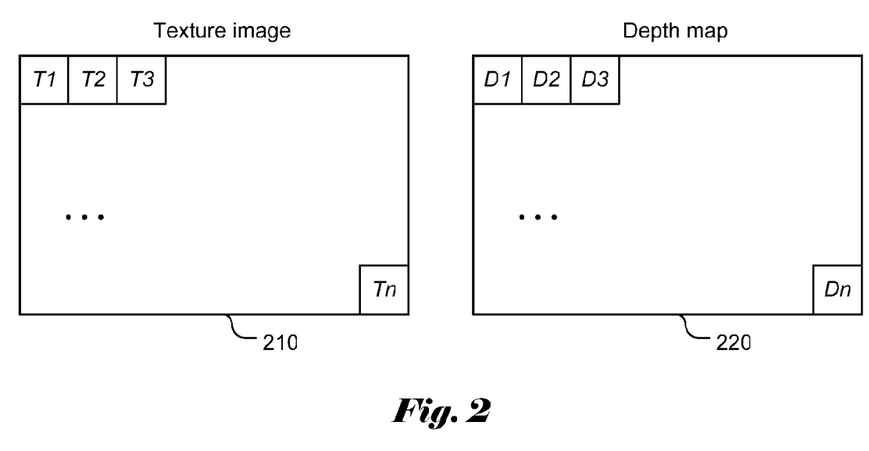
FIG. 2 illustrates an example of partitioning the texture image and the depth map into blocks, where the processing order may be picture-wise or block-wise.

In order to use information from the depth maps for compressing a block in the texture image, the needed information from the depth maps for compressing the block in the texture image has to be made available before compressing the current block. In typical video compression or processing system, the texture image and the depth map are usually processed block by block as shown in FIG. 2, where the texture image is partitioned into texture blocks T1, T2, T3, . . . , and Tn and the depth map is partitioned into depth blocks D1, D2, D3, . . . , and Dn, where n is the number of blocks in a texture image or a depth map. The processing order of the texture image and the depth map can be picture-wise, i.e., a whole depth map is processed before processing a texture image. Multiple depth maps may also be processed before processing a texture image so that the compression of a texture block may utilize information from multiple depth maps. The processing order may also be block-wise, i.e., the texture blocks and the depth blocks are processed in an interleaved manner. For example, the processing order may be D1, T1, D2, T2, D3, T3, . . . , Dn and Tn. Multiple blocks can be interleaved where interleaving can be based on every N blocks. For example, if N is equal to 4, the block-wise interleaving processing order can be D1, D2, D3, D4, T1, T2, T3, T4, D5, D6, D7, D8, T5, T6, T7, T8, and so on. Other block-wise interleaving patterns may also be used. Furthermore, the processing of texture blocks can be delayed in reference to the corresponding depth blocks. For example, the processing of a current texture block may utilize depth information associated with depth blocks around a co-located depth block. In this case, the processing of a current texture block has to wait till the needed depth blocks become available. The blocks shown in FIG. 2 are used as an example to demonstrate partitioning a texture image 210 or a depth map 220 into blocks. The blocks may be in different sizes. For example, a block can be a square, such as 4×4, 8×8, 16×16, 32×32 or 64×64 pixels, a rectangle, or a stripe that extends across the picture width. The block may also be in any shape.

Figure 3:
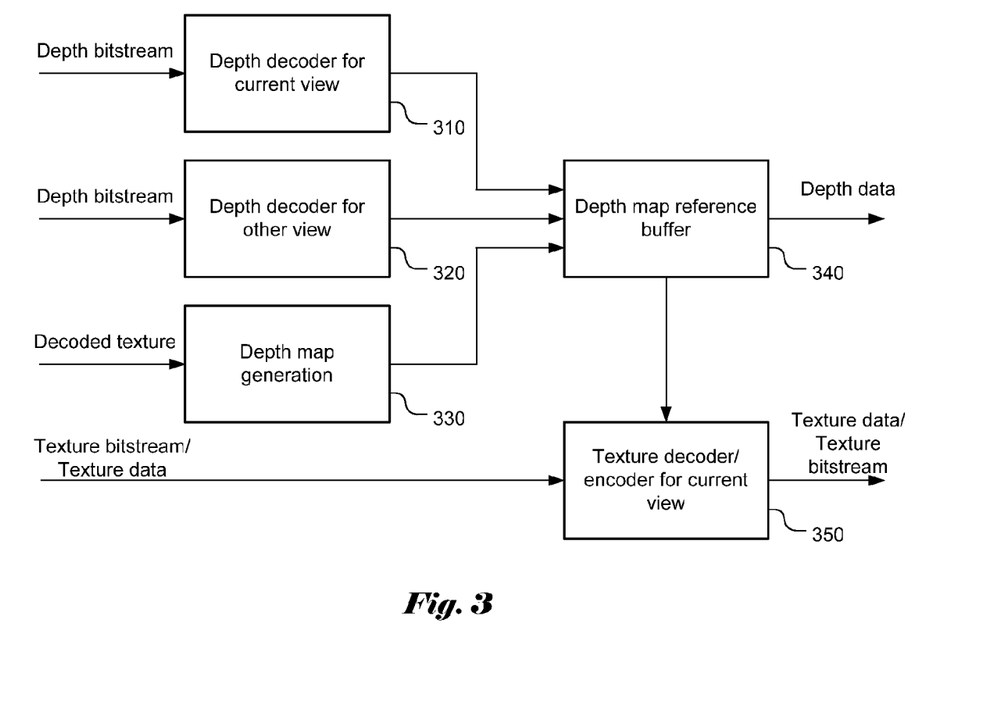
FIG. 3 illustrates exemplary methods for deriving depth information for texture image compression.

As mentioned before, embodiments of the present invention utilize available depth information for compressing a texture block. There are various means to derive the depth blocks and associated information as shown in FIG. 3. According to one embodiment of the present invention, the depth blocks and associated information can be derived from the depth bitstream associated with the current view. The depth bitstream may be separate from the texture-image bitstream. The depth bitstream may also be combined with the texture-image bitstream to form a single bitstream. A depth decoder may be used, as shown in block 310, to decode the depth bitstream to recover the depth blocks and associated information of the current view. The depth blocks and associated information of the current view may also be derived from the depth map of other views. In this case, a depth decoder may be used, as shown in block 320, to decode the bitstream to recover the depth information associated with the depth blocks of other views. The depth map corresponding to the current view may also be derived from the depth maps for other views. In yet another embodiment of the present invention, the depth blocks and associated information can be derived from decoded texture image using depth map generation as shown in block 330. In this case, the depth map corresponding to a current view may be derived from decoded texture images associated with the current view or other view. The depth map derived can be stored in the depth map reference buffer 340 and the information related to the depth map can be used for encoding or decoding of texture image for current view as shown in block 350. The derived depth maps according to various means as shown in FIG. 3 may be applied individually or jointly for decoding/encoding of the texture image for the current view.

Figure 4:
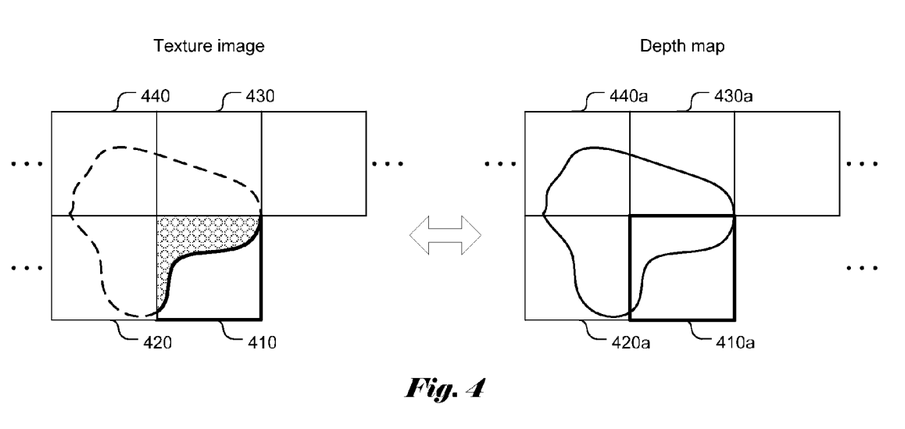
FIG. 4 illustrates an example of region partitioning of a texture image based on region partition information of the depth map.

In one embodiment according to the present invention, region partitioning of the texture image can be derived or inferred from the region partitioning of the depth map. FIG. 4 illustrates an example of region partitioning of a texture image according to the region partitioning of the corresponding depth map. The block of the texture image can be split to sub-blocks in arbitrary shapes or rectangular shapes according to the region partitioning of the depth map. For example, splitting of a current texture block 410 may be dependent on the corresponding depth block 410*a*. The current texture block 410 may be merged with one of its neighboring blocks 420, 430 and 440 according to whether the depth block 410*a* is merged with one of its neighboring blocks 420*a*, 430*a* and 440*a*. One flag can be used to indicate whether region partitioning for the texture image is derived from the depth map. Furthermore, if a sub-block and its neighboring coded block have similar depth data, the sub-block and its neighboring coded block can be merged so that the motion information of a neighboring block can be shared by the current block. The method of sharing motion information for merging with a selected spatial or temporal neighboring block is similar to the Merge mode in High Efficiency Video Coding Test Model Version 3.0 (HM3.0). Another flag can be used to indicate whether Merge is enabled or not.

Figure 5:
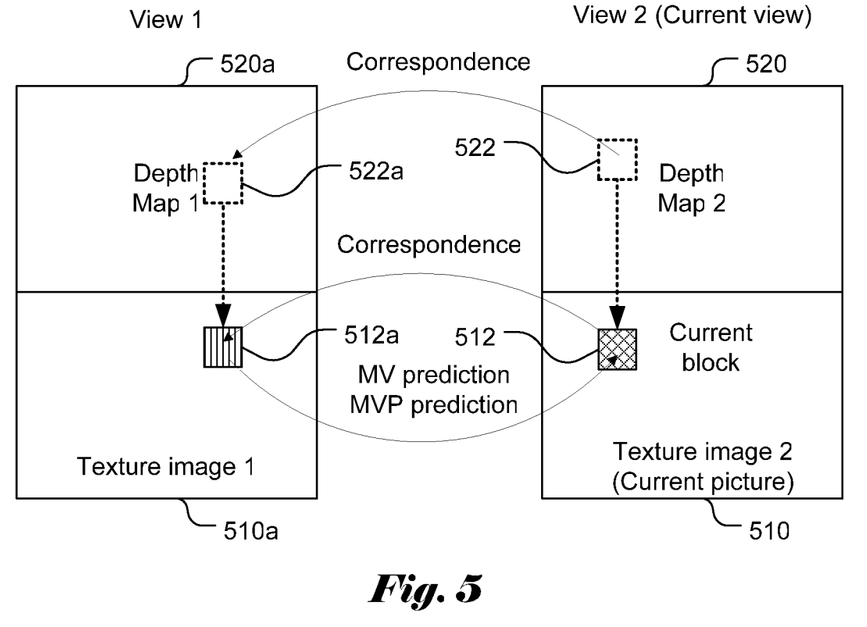
FIG. 5 illustrates an example of motion vector prediction process for texture image coding utilizing correspondence between two depth maps.

The motion information of the current view can be predicted from another view during motion vector prediction process as shown in FIG. 5, where the texture image 510 is the current texture image, the depth map 520 is the current-view depth map, the texture image 510*a* is the corresponding texture image in another view, and depth map 520*a* is the corresponding another-view depth map. If the correspondence between the depth block 522 of the depth map 520 in the current view and a corresponding depth block 522*a* of the depth map 520*a* in another view can be determined, the corresponding texture block 512*a* in another view associated with the current block 512 of the current texture image 510 can be derived. The motion information, such as motion vector, of the corresponding block 512*a* is applied to the current block 512 in the current view. The motion information may also comprise reference picture index, region partitions, prediction direction, and prediction mode. Similarly, the motion vector (MV) of the corresponding block 512*a* can be used as a motion vector predictor (MVP) of the current block 512.

The depth map can also be used for adaptive motion processing. The MVs can be classified according to the depth map with the assumption that near objects move faster in the texture image. Due to motion parallax, near objects often have large motions while far objects often have small motions. In the regions containing large motions, the spatial prediction may perform better than the temporal or inter-view prediction due to various reasons. Therefore, spatial MVPs have higher priorities if the real depth is small that implies that the motion may be large due to near objects and the spatial correlation may be higher. On the other hand, temporal or inter-view MVPs have higher priorities if the real depth is large that implies that the motion may be small due to far objects and the temporal or inter-view correlation may be higher. Therefore, the depth map is utilized for adaptive selection of spatial and temporal/inter-view MVPs as an example of motion process adapted to the depth information of the depth map.

MV classification based on the depth information can also be applied to the MVP pruning process. For texture blocks containing far objects, small MV candidates have higher priorities in the candidate list. In other words, large MV candidates have lower priorities or are removed from the list in regions containing far objects. As mentioned earlier, due to motion parallax, far objects undergoing the same displacement as near objects will result in smaller motion vectors. Therefore, it is less likely to have large motion vectors in the regions containing far objects. For near objects, both small motion vectors (including zero values motion vectors) and large motion vectors are likely to appear. These motion vectors, large or small, may represent real displacement of the near objects. Therefore, the region containing near objects may not prioritize candidate MVPs adapted to the motion classification.

According to another embodiment of the present invention, motion models can be adapted to the depth map in the MV prediction process. Texture images of near objects are suitable for perspective models. On the other hand, texture images of far objects are suitable for translational models. Again, for the reason mentioned earlier, far objects undergoing the same displacement as near objects will result in smaller motion vectors due to motion parallax. Usually, the simple translational motion model works better for smaller motions. For larger motions, it may have to pursue more complex perspective models.

According to yet another embodiment of the present invention, prediction mode of the current view can be derived from modes of another view or other views. A corresponding texture block in another view can be obtained by using depth information. The modes of the corresponding texture block, such as the prediction type, block size, reference picture index, prediction direction, and partition, can then be applied to the current texture block. The prediction type may include Inter/Intra, Skip, Merge and Direct modes.

The above description is presented to enable a person of ordinary skill in the art to practice the present invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiments of encoding and decoding texture images utilizing depth maps in 3D video coding systems according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for texture image compression in a three-dimensional (3D) video coding system, the method comprising:
encoding or decoding a depth map;
deriving depth information related to the depth map; and
encoding or decoding a texture image based on the depth information derived, wherein a processing order relating to an encoding order or a decoding order for the depth map and the texture image is based picture-wise interleaving, wherein the texture image is partitioned into texture blocks, wherein motion information of a texture block of the texture image is derived from motion information of a corresponding texture block in another view or a corresponding depth block of the depth map, and wherein a location of the corresponding texture block is derived based on the depth map,
wherein information for the processing order is indicated in a bitstream associated with the texture image,
wherein said encoding or decoding the texture image comprises determining a mode for a current region of the texture image based on a mode of a corresponding region of a corresponding texture image in another view.

2. The method of claim 1, wherein the depth information comprises depth data and partition information.

3. The method of claim 1, wherein, for decoder side, the depth map is decoded from a first bitstream comprising a first compressed depth map for a current view, decoded and derived from a second bitstream comprising a second compressed depth map for other view, or derived from a decoded texture image.

4. The method of claim 1, wherein the block-wise interleaving or the picture-wise interleaving is selected according to a flag in the bitstream associated with the texture image.

5. The method of claim 4, wherein the flag is incorporated in a sequence level, a picture level, a slice level, or a block level.

6. The method of claim 1, wherein partitioning a current texture block of the texture image is based on the depth information of the depth map.

7. The method of claim 6, wherein the texture blocks are in arbitrary shapes or rectangular shapes.

8. The method of claim 6, wherein whether to partition the current texture block of the texture image into sub-blocks is based on the depth information of a corresponding current block of the depth map.

9. The method of claim 8, wherein shapes of the sub-blocks are based on the depth information of the corresponding current block of the depth map.

10. The method of claim 8, wherein a flag is used to indicate whether the depth information of the corresponding current block of the depth map is used for partitioning the current texture block of the texture image into the sub-blocks.

11. The method of claim 1, wherein the texture image is partitioned into texture blocks and wherein whether to merge a current texture block of the texture image with another texture block of the texture image is based on the depth information of the depth map.

12. The method of claim 11, wherein a flag is used to indicate whether Merge mode is enabled.

13. The method of claim 1, wherein the motion information comprises MVs, reference picture index, region partitions, prediction direction, and prediction mode.

14. The method of claim 1, wherein said encoding or decoding the texture image comprises determining prediction modes for the texture image according to motion vectors associated with the texture image, and wherein the motion vectors are classified based on the depth information.

15. The method of claim 14, wherein first regions corresponding to near objects in the texture image as indicated by the depth information prefer to select spatial MVPs (Motion Vector Predictors), and wherein second regions corresponding to far objects in the texture image as indicated by the depth information prefer to select temporal or inter-view MVPs.

16. The method of claim 1, wherein said encoding or decoding the texture image comprises pruning MVPs (Motion Vector Predictors) for the texture image according to motion vectors associated with the texture image, and wherein the motion vectors are classified based on the depth information.

17. The method of claim 16, wherein one or more redundant candidate MVPs are removed from MVP candidate list, and wherein the candidate MVPs with large motions for regions corresponding to far objects in the texture image as indicated by the depth information are removed or given low priorities in the MVP candidate list.

18. The method of claim 1, wherein said encoding or decoding the texture image comprises determining motion models for deriving motion vectors for the texture image, and wherein said determining motion models depends on the depth map.

19. The method of claim 18, wherein first regions corresponding to far objects in the texture image derive the motion vectors according to a translation model, and wherein second regions corresponding to near objects in the texture image derive the motion vectors according to a perspective model.

20. The method of claim 1, wherein location of the corresponding texture block is derived based on the depth map in a current view, wherein location of the corresponding region is derived from location of the current region and location correspondence between the depth map associated with the texture image and the depth map associated with the corresponding texture image in said another view.

21. The method of claim 1, wherein the mode comprises prediction type, block size, reference picture index, prediction direction, and partition.

22. An apparatus for texture image compression in a 3D video coding system, the apparatus comprising at least one circuit configured for:
- encoding or decoding a depth map;
- deriving depth information related to the depth map; and
- encoding or decoding a texture image based on the depth information derived, wherein a processing order relating to an encoding order or a decoding order for the depth map and the texture image is based on picture-wise interleaving, wherein the texture image is partitioned into texture blocks, wherein motion information of a texture block of the texture image is derived from motion information of a corresponding texture block in another view or a corresponding depth block of the depth map, and wherein a location of the corresponding texture block is derived based on the depth map,
- wherein information for the processing order is indicated in a bitstream associated with the texture image,
- wherein said encoding or decoding the texture image comprises determining a mode for a current region of the texture image based on a mode of a corresponding region of a corresponding texture image in another view.

23. The apparatus of claim 22, wherein the depth information comprises depth data and partition information.

24. The apparatus of claim 22, wherein, for decoder side, the depth map is decoded from a first bitstream comprising first compressed depth map for a current view, decoded and derived from a second bitstream comprising second compressed depth map for other view, or derived from a decoded texture image.

25. The apparatus of claim 22, wherein partitioning a current texture block of the texture image is based on the depth information of the depth map.

26. The apparatus of claim 22, wherein the texture image is partitioned into texture blocks and wherein whether to merge a current texture block of the texture image with another texture block of the texture image is based on the depth information of the depth map.

27. The apparatus of claim 22, wherein said encoding or decoding the texture image comprises determining prediction modes for the texture image according to motion vectors associated with the texture image, and wherein the motion vectors are classified based on the depth information.

28. The apparatus of claim 22, wherein said encoding or decoding the texture image comprises pruning MVPs (Motion Vector Predictors) for the texture image according to motion vectors associated with the texture image, and wherein the motion vectors are classified based on the depth information.

29. The apparatus of claim 22, wherein said encoding or decoding the texture image comprises determining, based on the depth map, motion models for deriving motion vectors for the texture image.

* * * * *

UNITED STATES PATENT AND TRADEMARK OFFICE
CERTIFICATE OF CORRECTION

PATENT NO. : 9,918,068 B2  
APPLICATION NO. : 14/115099  
DATED : March 13, 2018  
INVENTOR(S) : Yu-Lin Chang et al.

Page 1 of 1

It is certified that error appears in the above-identified patent and that said Letters Patent is hereby corrected as shown below:

On the Title Page

Item (54) should read:  
-- (54) METHOD AND APPARATUS OF TEXTURE IMAGE COMPRESSION IN 3D VIDEO CODING --

Item (73) should read:  
-- (73) MEDIATEK INC., Hsin-Chu (TW) --

Signed and Sealed this  
Eighteenth Day of June, 2019

Andrei Iancu  
*Director of the United States Patent and Trademark Office*